(12) United States Patent
Gundavelli et al.

(10) Patent No.: US 10,698,645 B2
(45) Date of Patent: Jun. 30, 2020

(54) VIRTUAL PRINTER

(71) Applicant: SOLIX TECHNOLOGIES, INC., Santa Clara, CA (US)

(72) Inventors: Sai Gundavelli, Santa Clara, CA (US); Vikram Gaitonde, Sunnyvale, CA (US); Mark Lee, Glen Haven, CO (US); Mahesh Kumar Perugupalli, Hyderabad (IN); Suryanarayana Hota, Rajahmundry (IN)

(73) Assignee: SOLIX TECHNOLOGIES, INC., Santa Clara, CA (US)

( * ) Notice: Subject to any disclaimer, the term of this patent is extended or adjusted under 35 U.S.C. 154(b) by 659 days.

(21) Appl. No.: 15/182,615

(22) Filed: Jun. 15, 2016

(65) Prior Publication Data

US 2020/0133604 A1    Apr. 30, 2020

(51) Int. Cl.
*G06F 17/00* (2019.01)
*G06F 3/12* (2006.01)

(52) U.S. Cl.
CPC .......... *G06F 3/1288* (2013.01); *G06F 3/1238* (2013.01); *G06F 3/1248* (2013.01); *G06F 3/1273* (2013.01)

(58) Field of Classification Search
None
See application file for complete search history.

(56) References Cited

U.S. PATENT DOCUMENTS

| | | | | |
|---|---|---|---|---|
| 2010/0145955 A1* | 6/2010 | McDonald | .............. | G06F 16/29 707/754 |
| 2011/0264745 A1* | 10/2011 | Ferlitsch | .............. | G06Q 10/109 709/205 |
| 2013/0024475 A1* | 1/2013 | Sappey | .................. | G06F 16/93 707/771 |
| 2013/0148177 A1* | 6/2013 | Kuraya | .............. | H04N 1/00013 358/505 |
| 2014/0114657 A1* | 4/2014 | Huseby | .............. | G06Q 30/0241 704/235 |
| 2015/0278162 A1* | 10/2015 | Korneev | ............ | G06K 9/00483 707/690 |
| 2016/0092407 A1* | 3/2016 | Ball | ........................ | G06T 1/20 715/202 |
| 2017/0237871 A1* | 8/2017 | Fan | ...................... | H04N 1/0417 358/1.13 |

* cited by examiner

*Primary Examiner* — Andrew H Lam
(74) *Attorney, Agent, or Firm* — Sughrue Mion, PLLC

(57) ABSTRACT

A virtual printing system includes a driver system, a network, a virtual print server, a database, and a search and report terminal to capture and store a print stream in PDF or PDF/A format. The driver system captures and converts metadata and print data from the client devices into a print stream. The virtual printer receives and prints the print stream as PDF or PDF/A files. The search and report terminal aids in searching within the PDF or PDF/A files.

20 Claims, 3 Drawing Sheets

VIRTUAL PRINTER

BACKGROUND

Field of the Invention

The present invention relates to virtual printers. More particularly, the present invention relates to a virtual printer system that virtually prints digital content to a searchable database.

Description of the Related Art

Organizations create and maintain records such as Invoices, employment contracts, accounting documents, and legal contracts. The organizations create and maintain the records by way of multiple processing devices such as computers, laptops, and handheld devices. The processing devices execute various applications to generate and maintain the records. The applications generate the records based on received commands and data. Further, the applications store the records for future reference in the corresponding processing devices. For instance, a sales record generation application generates and stores sales records relating to vendors and corresponding sales transactions. Such records are periodically accessed by the organization and therefore, need to be stored securely.

Further, the applications may be upgraded or disabled based on the needs of the organizations over a period of time. Records generated prior to upgrading or disabling an application may be rendered inaccessible after the application is upgraded or disabled. Thus, there is a need to decouple the records from the application. Moreover, formats of the records are a function of the applications that generate the same. The records created by an application may not be compatible with another application. Therefore, the organizations have to bear an overhead of maintaining multiple applications to access the records in multiple formats. As a result, the records consume significant computing and storage resources that can otherwise be utilized for alternate functional purposes.

A known solution to the aforementioned problem is to store the records as portable document format (PDF) files in the processing devices. The PDF files may be accessed by way of a single application such as Abode Reader. Further, the PDF files may be printed as physical documents as well.

However, the PDF files do not include metadata such as user names, user IDs, time, date, system name, applications that generated the PDF files and the like corresponding to the records. Further, there is no provision to allow users to search, query, or index within the PDF files. Moreover, due to an absence of a role-based access to the stored PDF files, security of confidential records is a concern. Further, the PDF files are not used for auditing purposes, compliance, or audit trails because of an absence of integrity check algorithms within the processing devices.

The PDF files from multiple processing devices may be archived at a common location in a database archive. However, the database archive does not facilitate storing of metadata such as user name, user IDs, group names, group IDs, time, dates, system names, OS names, IP addresses, and the like. Moreover, the database archive does not provide information corresponding to the application that created the records.

In light of the foregoing discussion, there exists a need for a novel virtual printing system that can efficiently store the records and the corresponding metadata in various formats, that is deployable and scalable, and that overcomes the aforementioned drawbacks.

SUMMARY

An object of the present invention is to provide a method and system to print digital records virtually.

An embodiment of the present invention provides a virtual printing system that includes a driver system, a virtual print server, a database, and a search and report terminal. The driver system is installed on a client device. The driver system is connected to the virtual print server via a network. The client device includes software applications that send digital records for printing to a physical printer or a network printer. The driver system captures and converts print data and metadata corresponding to the digital records into a print stream. The driver system sends the print stream to the virtual print server that converts the print stream into a digital file of a predefined format. The digital file is then indexed and stored in the database. The virtual printing system provides a role-based access to the stored digital files.

BRIEF DESCRIPTION OF DRAWINGS

The features of the present invention, which are believed to be novel, are set forth with particularly in the appended claims. Embodiments of the present invention will hereinafter be described in conjunction with the appended drawings provided to illustrate and not to limit the scope of the claims, wherein like designations denote like elements, and in which:

DETAILED DESCRIPTION OF EMBODIMENTS

As used in the specification and claims, the singular forms "a", "an" and "the" Include plural references unless the context clearly dictates otherwise. For example, the term "an article" may include a plurality of articles unless the context clearly dictates otherwise.

Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention.

There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components which constitutes a virtual printing system to print and manage digital records. Accordingly, the components and the method steps have been represented, showing only specific details that are pertinent for an understanding of the present invention so as not to obscure the disclosure with details that will be readily apparent to those with ordinary skill in the art having the benefit of the description herein.

As required, detailed embodiments of the present invention are disclosed herein; however. It is to be understood that the disclosed embodiments are merely exemplary of the invention, which can be embodied in various forms. Therefore, specific structural and functional details disclosed herein are not to be interpreted as liming, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
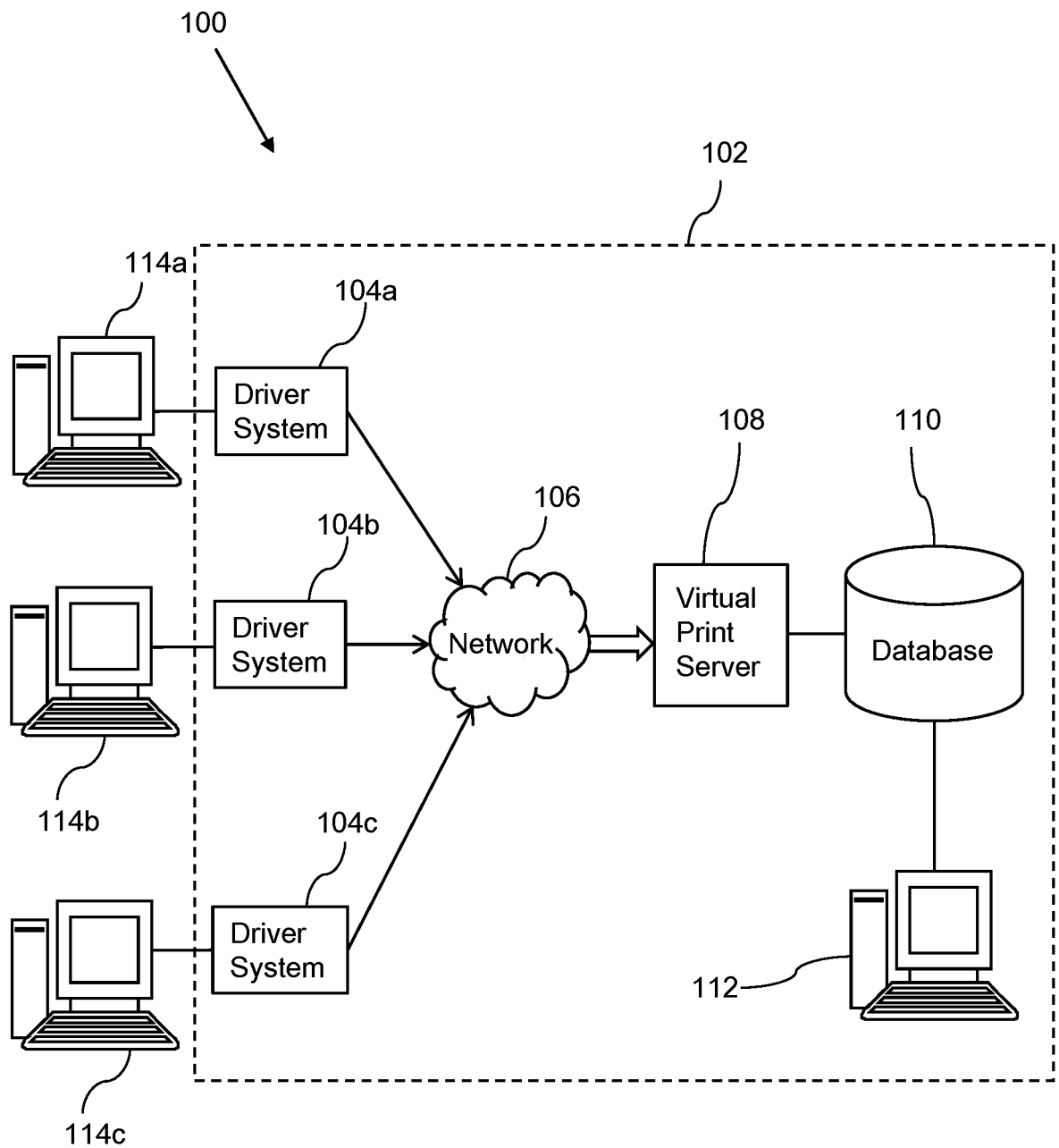
FIG. 1 is a schematic block diagram illustrating an environment in which a virtual printing system is deployed, according to an embodiment of the present invention.

Referring now to FIG. 1, a schematic block diagram illustrating an environment 100, including a virtual printing system 102, is shown. The virtual printing system 102 includes first through third driver systems 104a-104c, a network 106, a virtual print server 108 (also referred to as 'server'), a database 110, and a search and report terminal 112 (also referred to as 'search terminal') The first through third driver systems 104a-104c are installed on corresponding first through third client devices 114a-114c.

The client devices 114a-114c are connected to the virtual print server 108 via the network 106 through the corresponding driver systems 104a-104c. The network 106 may include a local area network (LAN), metropolitan area network (MAN), and wide area network (WAN) or the Internet. The virtual print server 108 is coupled to the database 110. Further, the database 110 has search and report capabilities enabled and may be accessed by way of the search and report terminal 112. The first through third client devices 114a-114c are hereinafter referred to as client devices 114, unless specified otherwise. The first through third driver systems 104a-104c are hereinafter referred to as driver systems 104, unless specified otherwise. It should be noted by the reader and the practitioner that, any number of client devices 114 can be connected to the virtual printing system 102. Similarly, any number of virtual print servers 108 may be implemented in the virtual printing system 102.

Various operating systems (OS) such as Windows, OS X, Linux, UNIX, and the like are implemented on the client devices 114. The driver systems 104 may function in conjunction with the operating systems on the corresponding client devices 114. In an embodiment, the virtual print server 108 is a cluster of first and second virtual print servers. The first and second driver systems 104a and 104b correspond to the first and second virtual print servers, respectively, and are installed on the first client device 114a. Thus, the first client device 114a can access both the first and second virtual print servers. For instance, the first and second virtual print servers correspond to a finance virtual print server and a human resource (HR) virtual print server, respectively. When a user of the first client device 114a needs to print to the finance and HR virtual print servers, the user installs the first and second driver systems 104a and 104b corresponding to finance and HR driver systems, respectively, on the first client device 114a.

Further, the client devices 114 store digital records (also referred to as 'digital documents') such as invoices, employment contracts, accounting documents, legal contracts, and the like. The client devices 114 include desktops, laptops, handheld devices, desktops accessing remote databases, and the like. Each client device 114 includes a memory to store the digital records. The client device 114 also accesses the digital records from remote databases, cloud storage, enterprise databases, and the like. The memory and databases may be structured data sources such as relational database management systems (RDBMS), enterprise resource planning (ERR) databases, customer relationship management (CRM) databases, packaged applications, and the like. Alternately, the memory and databases may be unstructured data sources such as file shares. SharePoint sites, File Transfer Protocol (FTP) sites, data on cloud servers, and the like. The users enable printing of the digital records by way of a custom application or generic print functions on the client devices 114. The print functions that enable the printing on the digital records are also referred to as print commands. The driver systems 104 are software that function with the OS installed on the client devices 114. The client devices 114 detect the virtual print server 108. Further, the driver systems 104 are configured to capture print data along with metadata of the digital records. The client devices generate the print data subsequent to the reception of the print commands. The print data includes data corresponding to the digital records which the user intends to print. The metadata includes data corresponding to the client devices 114, applications that generate the digital records, user details, time, and date. For instance, the metadata may include user name, user IDs, group names, group IDs, time, date, system names, OS name, Internet Protocol (IP) address, application names, and the like. The driver systems 104 convert the print data and the metadata into a print stream and send the print stream to the virtual print server 108. The print stream conforms to Postscript file format.

The virtual printer server 108 is server software that operates on a Hadoop duster. The virtual print server 108 is configured to receive the print stream. The virtual print server 108 corresponds to a department of an organization such as finance, engineering, HR, and the like. Various departments have dedicated virtual print servers.

Further, the virtual print server 108 converts the print data and the metadata in the print stream into a portable document format (PDF) or portable document format/application type (PDF/A) format. The virtual print server 108 includes Ghostscript software to covert the print stream into the PDF of PDF/A files. The virtual print server 108 stores the print stream as the PDF or PDF/A files in the database 110 by conforming to the Hadoop framework, which is based on the Hadoop Database File System (HDFS or HBASE). In an embodiment, the virtual print server 108 stores the print data and the metadata in HDFS and HBASE, respectively. Further, it should be noted that other non-limiting file systems such as an Apache spark file system, an IBM Netezza file system, an Oracle Exadata file system, a Pivotal Greenplum file system, a File Transfer Protocol (FTP) file system, an Amazon S3 file system, and a Windows Azure Storage Blob (WASB) file system can be implemented on the database 110.

The search and report terminal 112 allows the user to search the PDF or PDF/A flies stored in the database 110. The PDF or PDF/A files stored in the database 110 are made searchable using Soir, Lucene. and Tika engines of the Apache. Further, the PDF or PDF/A files are made reportable through Hive Queries (HQL). In an embodiment, a Hive table is implemented to query the metadata stored in the database 110. It should be noted that the searching and reporting functionalities may be implemented in the database 110 by using business intelligence tools such as Tableu, Cognos, Datameter, or any other non-limiting application that can access data over open database connectivity (ODBC) or Java database connectivity (JDBC) technology. Moreover, third party applications may use application programming interfaces (API) such as JavaScript Object Notation (JSON), JDBC/ODBC, Java, Web Services, and the like, to access the database 110.

In an embodiment of the present invention the virtual print server 108 and the database 110 may be deployed in a remote location. The print stream may be sent, by the driver systems 104, to the remote virtual print server 108 from an access location within the organization.

In another embodiment of the present invention, the virtual printing system 102 provides a role-based access to the PDF or PDF/A files. Multiple virtual print servers 108 and corresponding databases 110 may be deployed to provide the role-based access to the PDF or PDF/A files. For instance, a Virtual Finance Printing System can be deployed and made accessible to the finance team. The PDF or PDF/A flies are accessed by way of the search and report terminal 112. The virtual printing system 102 provides the role-based access through authentication protocols such as Kerberos, network information service (NIS), Active Directory, and the like, it should be noted that multiple search and report terminals 112 can be deployed for multiple databases 110. It should be further noted that multiple search and report terminals 112 can be deployed for the database 110.

In yet another embodiment of the present invention the virtual printing system 102 captures pr-generated PDF or PDF/A files. The pre-generated files are stored in SharePoint server, common internet file system (GIFS), network files system (NFS), FTP site, and the like. The virtual printing system 102 fetches the pre-generated PDF or PDF/A files and stores them in the database 110. Further, the virtual printing system 102 may set the role-based access to the files.

In yet another embodiment of the present invention the virtual printing system 102 allows the user to manually include additional metadata in the PDF or PDF/A files. For instance, the finance team users may add additional metadata to the PDF or PDF/A files stored in the Virtual Finance Printing System. The virtual printing system 102 may use this additional metadata to categorize the PDF or PDF/A files stored in the database 110.

In yet another embodiment of the present invention the driver system 104 is configured to capture facsimile data along with the metadata of the digital records. The client device 114 generates the facsimile data when the user intends to fax the digital records to a remote location. The client device 114 generating the facsimile data is a facsimile machine. The facsimile machine scans the digital records and transmits scanned data corresponding to the digital records through a communication network a standard facsimile format to a remote facsimile machine. The remote facsimile machine receives the scanned data and converts the scanned data into a form for printing documents which are a replica of the digital records scanned by the transmitting facsimile machine. Further, the driver system 104 converts the facsimile data and the metadata into a scan stream and sends the scan stream to the virtual print server 108. The scan stream is analogous to the print stream generated by the driver system 104. Further, the scan stream is received by the virtual print server 108 and converted into PDF or PDF/A file. In an embodiment the virtual print server 108 is a virtual fax server.

In yet another embodiment of the present invention the virtual print server 108 sends status information to the driver systems 104. The status information corresponds to a status of the virtual print server 108. The status information includes at least one of a busy status, an offline status, an available status and the like. The driver systems 104 can schedule the transmission of the print stream to the virtual print server 108 based on the status information of the virtual print server 108. The driver systems 104 request for the status information of the virtual print server 108 when it is ready to transmit the print stream to the virtual print server 108.

In yet another embodiment of the present invention the virtual printing system 102 stores the PDF or PDF/A files for legal audit, governance, and regulatory purposes. The stored PDF or PDF/A files need to be accurate for such regulatory purposes. To ensure data integrity, the virtual printing system 102 validates the print stream received from the driver systems 104. The virtual printing system 102 uses multiple data integrity algorithms such as Include columns summations, checksums, SHA-1, hash, MD5 hash, and the like to validate the fetched print stream.

Figure 2:
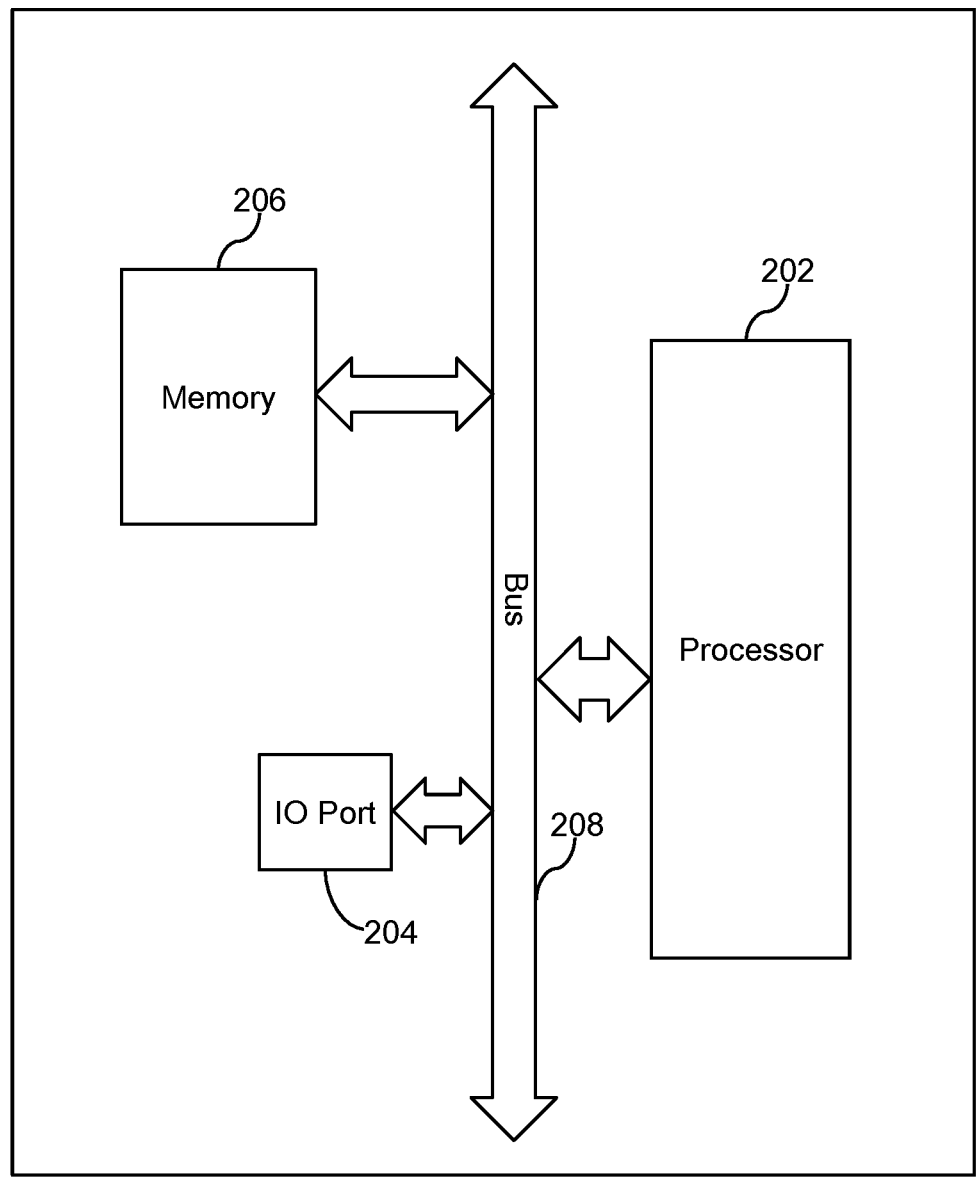
FIG. 2 is a schematic block diagram illustrating a computer system on which various embodiments of the present invention are implemented.

Referring now to FIG. 2, a computer system 200 includes instructions that are required to perform the methodologies described herein. The computer system 200 may be implemented as a server machine or a client machine in a client-server computer network or a peer machine in a peer-to peer or distributed network. The computer system 200 may be realized in the form of a personal computer, a laptop, a server, a set-top box (STB), a tablet, a personal digital assistant (PDA), a cellular telephone, a web appliance, a server, a network router, a network switch, a network bridge, a video game console, or any other machine that is capable of executing a set of computer instructions (sequential or otherwise) to be executed by the computer system 200. Further, while only a single computer system 200 is illustrated, the term 'computer system' shall also be taken to include any collection of virtual printing systems 102 that individually or jointly execute a set (or multiple sets) of instructions to perform any one or more of the methodologies discussed herein.

The computer system 200 includes a processor 202, an input/output (IO) port 204, a memory 206, and a system bus 208. The IO port 204 is an interface between the computer system 200 and an external network, such as the Internet. The IO port 204 may be connected to input devices such as keyboards, touch sensitive input devices, microphones, and so on to accept inputs from a user. The memory 206 stores sets of instructions to perform various functions described herein. The IO port 204 and the memory 206 communicate by way of the system bus 208. The processor 202 fetches and executes the sets of instructions from the memory 206.

Figure 3:
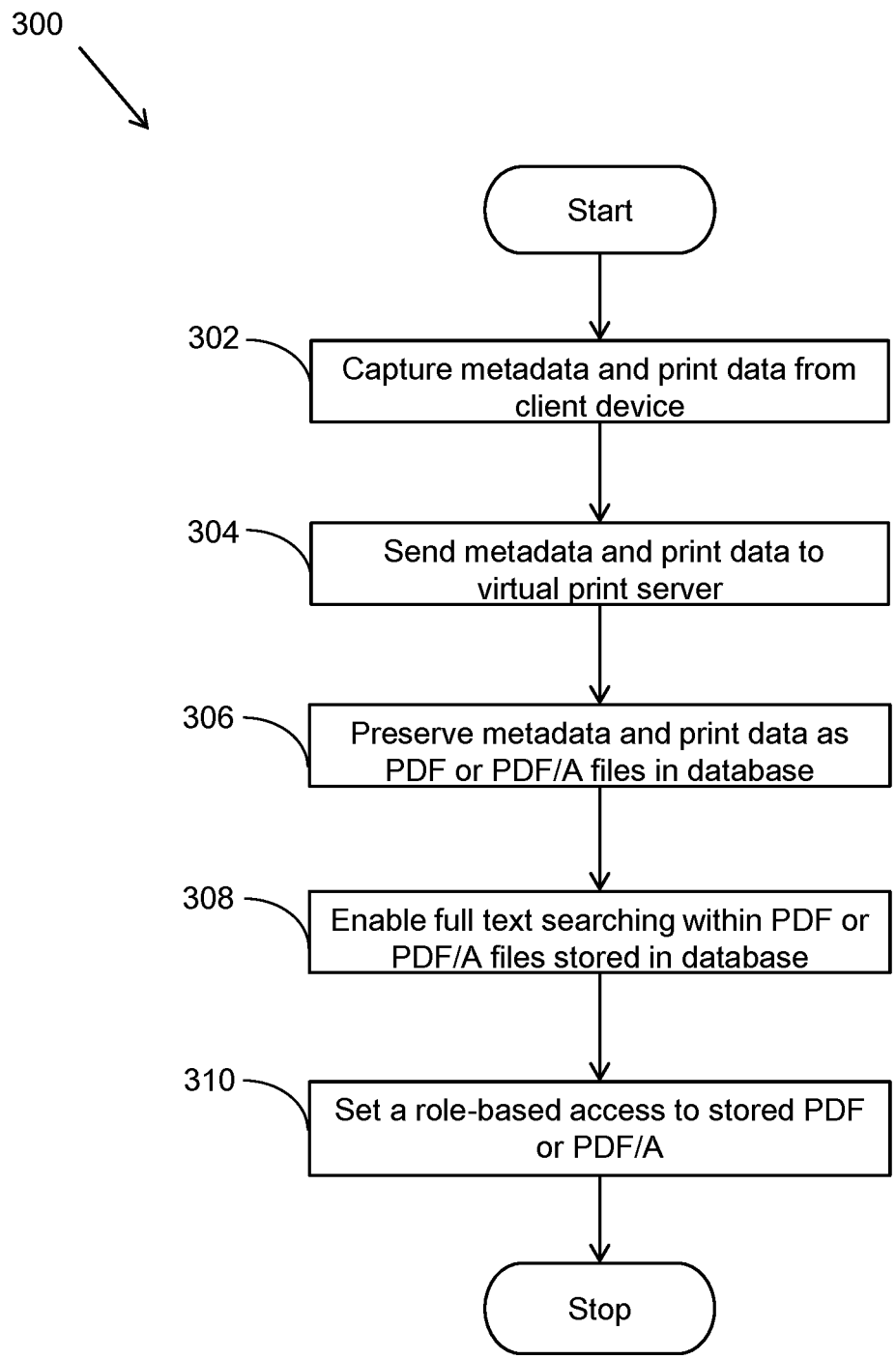
FIG. 3 is a flow chart illustrating a method to virtually print a digital record, according to an embodiment of the present invention.

According to an embodiment of the present invention, a method 300 to store and manage PDF or PDF/A flies is shown in a flowchart in FIG. 3. At step 302, the driver systems 104 capture the metadata and the print data from the client devices 114. The print functions are included in the applications installed on the client devices 114. The virtual print server 108 appears as a network printer or a physical printer to the client devices 114. When the client devices 114 select a print function to print the digital records through the physical printer or network printer, the driver systems 104 are invoked. Further, the driver systems 104 convert the metadata and the print data of the digital records into a print stream. At step 304, the driver systems 104 send the print stream to the virtual print server 108. The network 106 facilitates communication between the driver systems 104 and the virtual print server 108. At step 306, the virtual print server 108 converts the print stream into PDF or PDF/A files. The virtual printing system 102 indexes the PDF or PDF/A flies and stores the files in the database 110. At step 308, the virtual printing system 102 enables full text searching within the PDF or PDF/A files. The virtual print server 108 extracts the print data and the metadata from the PDF or PDF/A files and indexes the print data and the metadata to enable full text searching. Also, the virtual printing system 102 enables search across multiple PDF or PDF/A flies. At step 310, the virtual printing system 102 provides the role-based access to the PDF or PDF/A files stored in the database 110. The access rights, to the stored PDF or PDF/A files are set by way of the search and report terminal 112 by a user.

The present invention has been described herein with reference to a particular embodiment for a particular application. Although selected embodiments have been illustrated and described in detail, it may be understood that various substitutions and alterations are possible. Those having ordinary skill in the art and access to the present teachings may recognize additional various substitutions and alterations are also possible without departing from the spirit and scope of the present invention, and as defined by the following claim.

What is claimed is:

1. A virtual printing system for generating a portable document format (PDF) file, wherein the virtual printing system is connected to a user device, and wherein the user device includes a digital document, the virtual printing system comprising:
    a server that is communicatively coupled to the user device by way of a printer driver for receiving print data and metadata corresponding to the print data, generates the PDF file that includes the print data, wherein the user device includes the printer driver, wherein the user device receives a print command and generates the print data corresponding to the digital document, and wherein the printer driver captures the metadata corresponding to the print data;
    a memory that is connected to the server for receiving and storing the metadata and the PDF file, wherein the metadata and the PDF file are indexed and stored in the memory, and wherein the memory conforms to the Hadoop Distributed File System; and
    a search terminal connected to the memory for accessing the metadata and the PDF file, wherein the search terminal provides a role-based access to the metadata and the PDF file, and wherein at least one of an Apache Soir engine, an Apache Tika engine, and an Apache Lucene engine is used to search for the metadata and the PDF file.

2. The virtual printing system of claim 1, wherein a user provides the print command to the user device, and wherein the print command specifies the digital document that is to be printed.

3. The virtual printing system of claim 1, wherein status information of the server is transmitted to the printer driver by the server, and wherein the status information of the server includes at least one of a busy information, an offline information, and an available status information.

4. The virtual printing system of claim 1, wherein the metadata includes at least one of a user name, a user identification, a group name, a group identification, an operating system name, an Internet Protocol address, an application name, a system name, a date, and a time.

5. The virtual printing system of claim 1, wherein additional metadata corresponding to the PDF file is included by way of the search terminal, and wherein the additional metadata is indexed and stored in the memory.

6. The virtual printing system of claim 1, wherein the server performs an integrity check on the print data and the metadata using a plurality of integrity check algorithms, and wherein the plurality of integrity check algorithms include at least one of checksums, SHA-1 hashes, and MD5 hashes.

7. The virtual printing system of claim 1, wherein the server communicates with the user device by way of the printer driver using a port address of the user device.

8. The virtual printing system of claim 1, wherein the printer driver converts the print data and the metadata into Postscript data, and wherein the server receives the Postscript data and converts the Postscript data into the PDF file using a Ghostscript software.

9. The virtual printing system of claim 1, wherein the memory conforms to at least one of an Apache spark file system, an IBM Netezza file system, an Oracle Exadata file system, a Pivotal Greenplum file system, an FTP file system, an Amazon S3 file system, and a Windows Azure Storage Blob (WASB) file system.

10. The virtual printing system of claim 1, wherein the printer driver receives facsimile data from the user device, wherein the user device is a facsimile machine and the facsimile data corresponds to the digital document.

11. A method for generating a portable document format (PDF) file by a virtual printing system, the method comprising:
    receiving print data corresponding to a digital document by a printer driver, wherein a user device includes the printer driver and the digital document, and wherein the user device receives a print command and generates the print data;
    capturing metadata corresponding to the print data by the printer driver, wherein the metadata is captured subsequent to the reception of the print data;
    converting the print data and the metadata into Postscript data by the printer driver;
    receiving the Postscript data by a server, wherein the server is communicatively coupled to the user device by way of the printer driver;
    extracting the print data and the metadata from the Postscript data by the server;
    generating the PDF file that includes the print data by the server;
    receiving the PDF file and the metadata by a memory, wherein the memory is connected to the server;
    storing the metadata and the PDF file by the memory, wherein the metadata and the PDF file is indexed and stored in the memory, and wherein the memory conforms to the Hadoop Distributed File System; and
    accessing the metadata and the PDF file by way of a search terminal, wherein the search terminal provides a role-based access to the metadata and the PDF file, and wherein at least one of an Apache Solr engine, an Apache Tika engine, and an Apache Lucene engine is used to search for the metadata and the PDF file.

12. The method of claim 11, wherein a user provides the print command to the user device, and wherein the print command specifies the digital document that is to be printed.

13. The method of claim 11, wherein status information of the server is transmitted to the printer driver by the server, and wherein the status information of the server includes at least one of a busy information, an offline information, and an available status information.

14. The method of claim 11, wherein the metadata includes at least one of a user name, a user identification, a group name, a group identification, an operating system name, an Internet Protocol address, an application name, a system name, a date, and a time.

15. The method of claim 11, wherein additional metadata corresponding to the PDF file is included by way of the search terminal, and wherein the additional metadata is indexed and stored in the memory.

16. The method of claim 11, wherein the server performs an integrity check on the Postscript data using a plurality of integrity check algorithms, wherein the plurality of integrity check algorithms include at least one of checksums, SHA-1 hashes, and MD5 hashes.

17. The method of claim 11, wherein the server converts the Postscript data into the PDF file using Ghostscript software.

18. The method of claim 11, wherein the memory stores the metadata in an Optimized Row Columnar (ORC) file format.

19. The method of claim 11, wherein the memory conforms to at least one of an Apache spark file system, an IBM Netezza file system, an Oracle Exadata file system, a Pivotal Greenplum file system, an FTP file system, an Amazon S3 file system, and a Windows Azure Storage Blob (WASB) file system.

20. The method of claim 11, wherein the printer driver receives facsimile data from the user device, and wherein the user device is a facsimile machine and the facsimile data corresponds to the digital document.

* * * * *